United States Patent

Glass et al.

[15] 3,700,912

[45] Oct. 24, 1972

[54] RADIATION-RESISTANT LINBO AND OPTICAL DEVICES UTILIZING SAME

[72] Inventors: Alastair Malcolm Glass, Millington; George Earl Peterson, Short Hills, both of N.J.

[73] Assignee: Bell Telephone Laboratories Incorporated, Murray Hill, N.J.

[22] Filed: May 12, 1971

[21] Appl. No.: 142,477

[52] U.S. Cl..................307/88.3, 321/69 R, 330/4.5, 331/107 R, 350/160 R, 350/161

[51] Int. Cl...............................H03f 7/04, G02f 1/28

[58] Field of Search.....307/88.3; 321/69; 331/107 R; 350/160, 161; 330/4.5

*Primary Examiner*—Roy Lake

*Assistant Examiner*—Darwin R. Hostetter

*Attorney*—R. J. Guenther and Edwin B. Cave

[57] ABSTRACT

Room temperature use of $LiNbO_3$ in devices involving transmission of coherent radiation has been restricted by the observation that the material "damages" in relatively short periods at commonly used intensity levels. Such damage takes the form of the development of local refractive index inhomogeneities which scatter the radiation. Such damage is reduced to a level sufficient to permit use of $LiNbO_3$ in any such device at room temperature by maintenance of the concentration level of $Fe^{2+}$ impurity at less than 10 ppm and by annealing at temperatures below 700° C. In a preferred embodiment, at least a portion of such said annealing is carried out with the sample under the influence of an imposed electric field.

9 Claims, 6 Drawing Figures

INVENTORS A.M. GLASS
G.E. PETERSON
BY
George S. Indig
ATTORNEY

RADIATION-RESISTANT LINBO AND OPTICAL DEVICES UTILIZING SAME

BACKGROUND OF THE INVENTION

1. Filed of the Invention

The invention is concerned with the preparation of lithium niobate (nominally of the composition $LiNbO_3$) as well as with devices utilizing such material. Such devices may bZ"linear", as electrooptic or accoustooptic devices, or nonlinear, as in second harmonic generators and various other parametric devices such as oscillators, modifiers, mixers, etc. be 2. Description of the Prior Art The development of the laser was rapidly followed by studies directed toward development of ancillary circuit elements. A significant class of such elements depend upon some type of modification of laser radiation. In one category of devices sometimes considered "linear" devices, the modification may take the form of amplitude, frequency, phase, or special modulation, which may be fixed or may depend on an imposed signal. This category is of particular significance in communications where the possibility is contemplated of utilizing the laser radiation as a broadband carrier and the various modulation means may serve for introducing subcarriers and for signal modulation.

Another category of devices depends upon the "nonlinear" effect (nonlinear variation of magnitude of induced polarization relative to signal strength). Such devices are ordinarily utilized to produce some form of frequency shifting. Important examples take the form of second and higher order harmonic generators (SHG, etc.) and parametric mixers, downshifters, oscillators, and modulators.

For a time, perhaps the most significant material for both such categories was KDP (potassium dihydrogen phosphate). Prevalent use of this material was largely based on the availability of large crystalline sections of requisite perfection and on a usable magnitude of the relevant coefficient, be it linear or nonlinear.

A significant advance was made with the announcement that many of the properties of KDP were found in enhanced form in lithium metaniobate (represented by the nominal formula $LiNbO_3$), see Applied Physics Letters 5, 62 (1964) and *Applied Physics Letters* 5, 234 (1964). Device properties of consequence include a nonlinear coefficient $d_{31}$ 11 times the value of the best coefficient of KDP, an electrooptic figure of merit ($n_3^3$ $r_{33}$) where $n_3$ is the refractive index in the C direction and $r_{33}$ is the relevant electrooptic coefficient about eight times that of KDP. This new material, reasonably transparent over the range of from about 8 micrometers to 0.3 micrometers, was found to be chemically and physically stable under most encountered conditions. It was found to have sufficient birefringence to permit phase matching at reasonable temperatures for waves bearing a variety of frequency relationships. It was found to have an acoustooptic coefficient of sufficient magnitude to suggest its use in modulators, deflectors, Q-spoilers, etc. Early difficulties having to do with crystalline imperfection or other forms of scattering sometimes found to be related to multidomain configurations, etc., have been largely overcome through a series of developments resulting from intensive studies by a number of workers.

A major obstacle to the commercial utilization of this otherwise excellent material takes the form of a phenomenon sometimes called "radiation damage" or "laser damage". Accordingly, it is observed that illumination of $LiNbO_3$ samples by radiation intensities ordinarily encountered in the enumerated uses produce scattering centers which at first impair and finally destroy effective utilization. See *Applied Physics Letters* 9, 72, (1966). Such scattering centers are attributed to local inhomogeneities in refractive index which develop and shift while the device is in use. While the phenomenon is time dependent, ordinary levels resulting even from use of relatively low power CW lasers may render a crystal useless in periods of the order of one second.

A similar damage effect observed in the related material $LiTaO_3$, a material useful primarily for its linear rather than its nonlinear effects, may be avoided by field annealing. This procedure, which takes the form of a prolonged exposure to an electric field at elevated temperature, has been responsible for the effective utilization of this composition. Since $LiTaO_3$ must be rendered single domain for most uses, since this condition is accomplished by conventional "-poling" (exposure of the crystalline sample to an electric field while dropping the temperature from the ferroelectric Curie point), it was found convenient to carry out the field anneal step simply by prolonging the poling procedure. $LiTaO_3$ is conventionally field annealed at temperatures of the order of from 500°C to 700°C (temperatures centering about the ferroelectric Curie point of about 620°C). Based on the observation that required duration of effective treatment was reduced by increasing temperature within this range consistent with the postulated mechanisms considered responsible for damage (involving ionic impurities), field annealing of $LiTaO_3$ is ordinarily carried out at or above the Curie temperature. See 38 *Journal of Applied Physics* 3109, (1967).

Very shortly after it was observed that radiation damage could be reduce or minimized in $LiTaO_3$ by such field annealing, similar procedures were tried on $LiNbO_3$. Much smaller improvement in damage resistance due to such treatment was observed. See 38 *Journal of Applied Physics* 3109 (1967), 41 *Journal of Applied Physics* 3278 (1970) and 40 *Journal of Applied Physics* 3389 (1969). Neither field annealing nor any other procedure has been effective in producing sufficiently radiation-resistant $LiNbO_3$ for usual device operation.

At this time, it having been observed that radiation damage may be annealed out or avoided by operation of $LiNbO_3$ devices at elevated temperature (e.g., at or above about 200°C), there is an effort directed toward development of $LiNbO_3$ materials having appropriate device properties for use at such temperature, see *Applied Physics Letters* 12, 92 (1968) and *Applied Physics Letters* 17, 104 (1970). For example, the only reported operating CW parametric oscillator was operated at such temperature, see *Applied Physics Letters* 17, 497 (1970).

SUMMARY OF THE INVENTION

Radiation damage is substantially reduced in materials of the nominal composition $LiNbO_3$ by one or a combination of procedures. The first of these is directed toward the maintenance of an extremely low concentration of iron impurity, particularly $Fe^{2+}$; acceptable levels being found to lie below 10 ppm total iron and preferably below 5 ppm or less (expressed in terms of total cation content, i.e., Fe ions/Li ions + Nb ions). The second involves annealing in an oxygen-containing atmosphere for substantial periods (typically 5 hours or longer) at temperatures below about 700°C. The third, which may be carried out in conjunction with the second, is a field annealing procedure again carried out below a temperature of about 700°C and utilizing fields sufficient to produce a current density of the order of at least about 1 milliampere per square centimeter of cross-section. Field annealing is carried out for shorter periods (i.e., up to about 30 minutes) since longer periods may result in harmful side effects.

As will be evident from the Detailed Description, minimization of iron impurity, while responsible for a marked reduction in damage, has, at least to date, resulted in crystals which may be significantly improved by following with at least one of the two annealing procedures. A preferred embodiment involves non-field annealing or both types of annealing.

Use of the inventive materials for the first time results in practical long-term (more than one second) operation of both linear and nonlinear devices at temperatures below about 100°C. Of particular immediate significance is the feasibility of CW parametric oscillator operation. Also of importance, however, is the feasible low temperature operation of the whole variety of devices for which $LiNbO_3$ has been found to be of interest. These include all of the devices noted, i.e., electrooptic modulators dependent upon amplitude, frequency, or phase change; acoustooptic devices operating as Q-spoilers, modulators, deflectors, scanners and optical filters; and nonlinear devices such as harmonic generators, parametric downshifters (both degenerate and nondegenerate), parametric oscillators, amplifiers, etc. All such devices are representative of the class of $LiNbO_3$ devices which constitute an aspect of the invention.

The significance of radiation damage increases with frequency and has been a most significant problem at wavelengths below about 0.65$\mu$. Devices designed for operation involving exposure to wavelengths below 0.65$\mu$ are, therefore, of particular consequence from the inventive standpoint and such devices also constitute a preferred embodiment.

DETAILED DESCRIPTION

1. The Drawing

Figure 1:
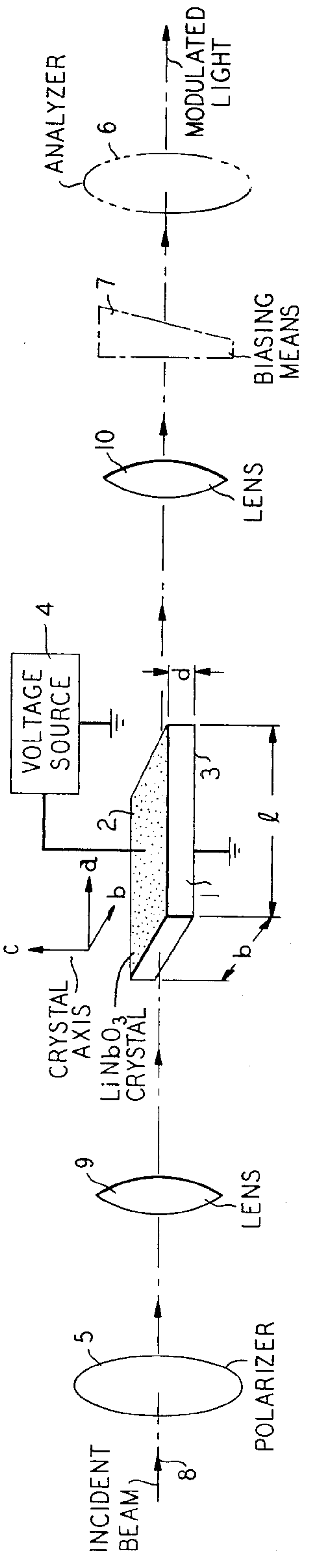
FIG. 1 is a schematic view of an electrooptic modulator using a crystal of $LiNbO_3$ processed in accordance with the invention.

The device of FIG. 1 is representative of the class utilizing $LiNbO_3$ as a linear material, i.e., a material in which the effect of concern is, at least over some range, linearly dependent on the magnitude of the influence causing the effect. The particular device of this figure is a species of electrooptic modulator. It comprises electrooptic modulator 1 composed of a single crystal of $LiNbO_3$ in accordance with the invention. In one preferred use, a crystal may be cut with the orientation as shown (a short dimension across which field is applied corresponding with the c-axis). Illustrative dimensions are 0.10 inch in height and thickness and 0.4 inch in length. Electrodes are affixed to surfaces 2 and 3 across which an electric field source for modulating the carrier is introduced for modulating the carrier as from voltage source 4. Body 1 is placed between a pair of crossed polarizers, 5 and 6, having their polarization directions oriented at +45° and −45° with respect to the c-axis of body 1. A biasing source 7 which may, for example, be a quartz wedge, is used to adjust to extinction or to the required relative transmission intensity depending upon the desired mode of operation. A beam 8 of electromagnetic wave energy as from a helium-neon laser is propagated as shown. Lens 9 serves to focus the beam within body 1 and lens 10 is used to focus the exiting beam.

Of course, the specific description of FIG. 1 is to be considered but illustrative. It is conventional to operate electrooptic devices in such manner as to modulate frequency or phase rather than amplitude and also to use a retraversing transmission path. Frequency and phase modulation are most expeditiously achieved by causing the plane of polarization of the incident beam 8 to coincide with a major axis which in turn is either orthogonal to or parallel to the applied field direction.

Figure 2:
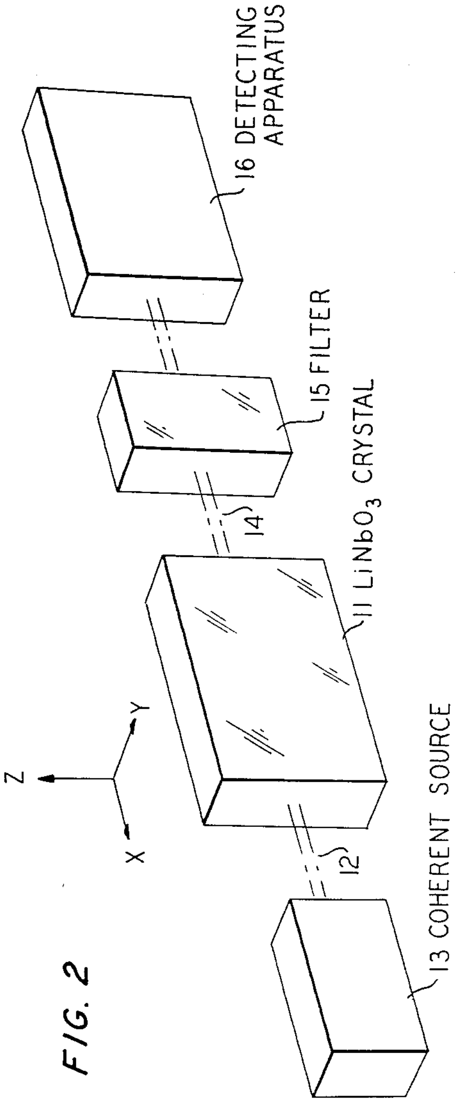
FIG. 2 is a schematic view of a nonlinear device using such an $LiNbO_3$ crystal.

In FIG. 2 there is depicted a single crystal body 11 of $LiNbO_3$. The crystallographic orientation of the body is indicated on the figure. A coherent electromagnetic beam 12 produced by source 13 is introduced into body 11, as shown. The resultant emerging beam 14 is then caused to pass through filter 15 and, upon departing, is detected by apparatus 16. For the SHG case, beam 12 is of a fundamental frequency while departing beam 14 additionally contains a wave of a frequency corresponding with the "second" harmonic of beam 12. Filter 15 is of such nature as to pass only the wave of concern, in the SHG instance that of the harmonic. Apparatus 16 senses only that portion of the beam leaving filter 15.

The device of FIG. 2 may similarly be regarded as a three-frequency device, with beam 12 containing frequencies to be mixed or consisting of a pump frequency. Under these conditions, exiting beam 14 contains signal and idler frequencies as well as pump, representing three distinct values for nondegenerate operation. For any operation, whether two frequency or three, efficiency is increased by resonance. Such may be accomplished by coating the surfaces of crystal 11, through which the beam enters and exits. This coating may be partially reflecting only for a generated frequency, as for example for the harmonic in SHG. For the three-frequency case, it is desirable to support both generated frequencies. In most instances, this cannot be accomplished by coating the face of the crystal, and it is necessary to provide at least one spaced adjustable mirror which may be positioned at such distance from the face of the crystal 11 as to support the frequencies of concern. Simultaneous support of the pump frequency may similarly be accomplished. However, the complication so introduced is justified only when the pump level requires it.

The crystalline orientation shown as the initial position for crystal 11 in the apparatus of FIG. 2 eliminates the effect of double refraction, as has been discussed. This angle may be retained for a broad range of conditions when operating either in the degenerate or nondegenerate mode, for example, simply by controlling temperature.

Figure 3:
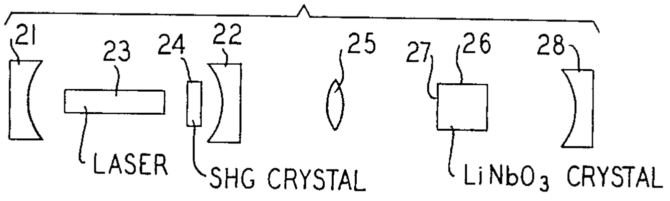
FIG. 3 is a schematic view of an apparatus including one form of parametric device utilizing a material of the invention.

FIG. 3 depicts a parametric device with greater specificity than FIG. 2. In the device depicted, curved mirrors 21 and 22 together with laser oscillator 23 and SHG element 24 form a coherent light source with an output frequency which sets a maximum limit on the output frequency of the parametric element. While SHG element 24 is not in principle required, its use represents an effective means for producing coherent radiation at a visible frequency from a solid state source. Since the $LiNbO_3$ parametric device has a low threshold, it is feasible to operate with other visible frequency sources, e.g., a gas laser so obviating the need for SHG element 24.

The most efficient solid state laser at this time, at least for CW use, is yttrium aluminum garnet containing neodymium. For this example, initial laser operation is at 10,640 A. units so that the SHG-produced radiation leaving element 22 is at twice this frequency or at 5320 A. units. The only requirement of the structure including elements 21 through 24 or its substitute is that it operate over a frequency range to which $LiNbO_3$ is substantially transparent. As indicated, this range is from about 60,000 A. to 3,500 A. Since most parametric devices result in down-conversion, pump sources more usefully approach the short wavelength limit than the long.

It has been indicated that the pump may be such as not to require an SHG element 24. In other arrangements, it may be desirable to use some higher harmonic. One proposed method is to incorporate an additional SHG element.

A significant aspect of the $LiNbO_3$ devices is that they are capable of operating continuously. Nevertheless, pulsed operation is not precluded. Accordingly, the pump may include a pulsed laser.

Coherent emission passing through partially reflecting mirror 22 is then focused by lens 25 so as to come to a focal point within the parametric oscillator cavity which includes elements 26 and 28. Of these, element 26 is a crystal of the $LiNbO_3$ which is coated at surface 27 with a dielectric coating having significant transmission at the frequency of the pump. The oscillator cavity is defined by coating 27 and by separate curved mirror 28 also provided with a dielectric coating of the approximate properties of that utilized at 27. The interior face of the oscillator crystal 26 as well as nonreflecting interior surface of elements 23 and 24 in the propagation direction are also coated with an antireflection coating.

Figure 4:
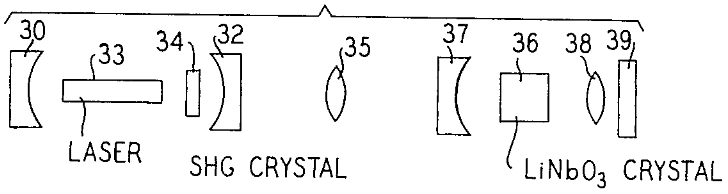
FIG. 4 is a schematic view depicting apparatus including a form of parametric device alternative to that of FIG. 3.

FIG. 4 depicts an apparatus alternative to FIG. 3 in which elements 30, 33, 34, 32, 35, 36 and 39 perform the functions of elements 21, 23, 24, 22, 25, 26 and 28, respectively, of FIG. 3. The arrangement differs in the substitution of curved mirror 37, for flat reflecting surface 27, and in the insertion of double convex lens 38. Alternative structures, for example, utilizing one or more curved reflecting surfaces integral with the crystal are apparent.

Figure 5:
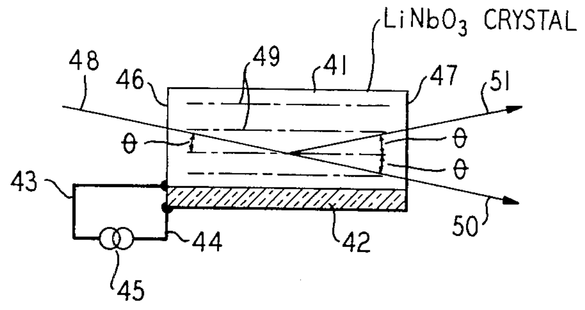
FIG. 5 is a schematic view, partly in section, of a Bragg deflector again utilizing a crystal of $LiNbO_3$ in accordance with the invention, as the operative element.

The device of FIG. 5 is a Bragg deflector consisting of acoustoopic element 41 made of $LiNbO_3$ and elastic wave source 42. Source 42 may be a piezoelectric transducer made, for example, of lithium niobate and, in this illustration, is shown equipped with electrodes 43 and 44 connected with AC or modulating source 45. In this illustration, body 41 is provided with optically polished surfaces 46 and 47. These surfaces may also be equipped with transparent coatings to protect them and/or to minimize reflection losses. In operation, a beam 48 of electromagnetic wave energy (which may be focused or defocused by a lens system not shown) of a wavelength within the transparency bandwidth of the $LiNbO_3$ is introduced (after being refracted at the surface) at some angle, or $\theta$, to the advancing elastic wave fronts diagrammatically denoted 49. While some of beam 48 continues through body 41 and exits as beam 50 in a direction identical to that of beam 48, a discrete portion is deflected by interaction with the elastic wave into an angle $2\theta$ and emerges as beam 51.

The diagrammatic view of FIG. 5 illustrates a device utilizing a Bragg deflector in accordance with which the incident and diffracted beams are at the same angle, known as the Bragg angle, to the advancing elastic wave front. Bragg deflectors are, however, operative over a limited range of angles centered about this optimum orientation. The Bragg diffraction condition requires constructive interference of scattered light waves. This condition is satisfied when the path distance traversed by a light wave diffracted by one elastic wave front is one light wavelength greater than the path length of a light wave diffracted from an adjacent wave front. For some operating conditions in which the sound wavelength is appreciably larger than the light wavelength, the diffraction angle $2\theta$ may be approximated as equal to the ratio of the light wavelength to the elastic wavelength. Since the elastic wavelength is, in turn, equal to the ratio of the elastic wave velocity to the elastic frequency, and since the velocity is constant within a given medium for a given direction of acoustic wave propagation, the diffraction angle, to a first approximation, is directly proportional to the elastic wave frequency. Variation in this frequency, therefore, permits selection of any of a variety of deflection angles. Advantage is taken of this relationship in a multiposition $x$, $y$ deflector system.

Figure 6:
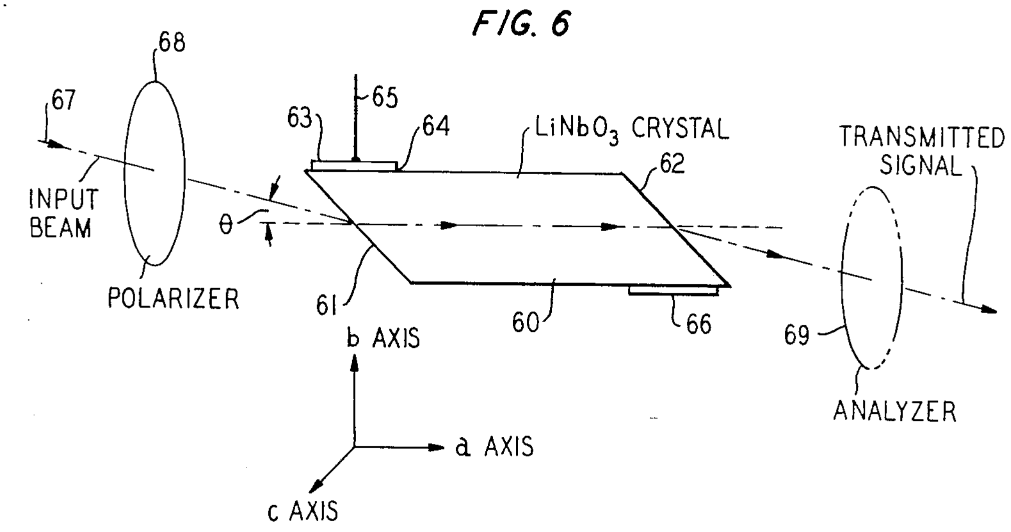
FIG. 6 is a schematic view of an acoustooptic filter utilizing material of the invention.

FIG. 6 is illustrative of a class of acoustooptic filters which utilize the co-linear interaction of a standing or traveling acoustic wave and a beam of electromagnetic radiation. It is the essence of such devices that electromagnetic radiation, including energy, of more than one wavelength may be processed so as to selectively extract (deflect, reflect or transmit) one or more of the included wavelengths. Such devices may, accordingly, act as frequency selectors which may be fixed or tunable as, for example, in conjunction with a broadband laser or may be used to extract signal information. Devices of this nature have received some attention in the recent literature, see, for example, Vol. 15, *Applied Physics Letters*, p. 325 (1969) and Vol. 17, *Applied Physics Letters*, p. 223 (1970). A complete description of such devices is set forth in those references. A brief description considered sufficient for the purpose of this disclosure is set forth below.

The device depicted which relies upon interaction of electromagnetic energy with a traveling acoustic wave utilizes crystal 60 constructed of $LiNbO_3$ and processed in accordance with the invention. This crystal is provided with two optically polished surfaces, input surface 61 and output surface 62. Crystal 60 is provided with a shear-wave transducer 63 constructed of a piezoelectric material such as $LiNbO_3$. This transducer is responsible for propagating a sound wave under the influence of an A.C. field applied across electrodes 64 and 65 attached to electric means not shown. The acoustic wave, upon being generated at the interface of elements 63 and 60, is reflected by surface 61 which latter is cut at an angle of 45° to the beam propagation direction so that the resulting acoustic wave travels colinearly with the beam. Surface 62 is similarly cut at 45° and is parallel to 61 so causing reflection of the acoustic wave to a direction orthogonal to that of the beam traversal direction. An absorber 66 is provided for preventing reflection of the acoustic wave. Input beam, schematically represented as arrow 67, is introduced into crystal 60 through surface 61 at an angle, $\theta$, such that the beam direction within crystal 60 is along an a-axis (the long dimension of a crystalline element as depicted). Beam 67 necessarily consists of at least two different wavelengths of energy. It may consist of two coherent or incoherent rays or may present a board spectrum, again, of coherent or incoherent radiation. Introduction of beam 67 is via a plane polarizing element 68. Operation of the device is similar to that of the device of FIG. 1 but depends upon the traveling shear wave to produce a disproportionate change in refractive index in one of two directions both orthogonal to the beam (in the device shown these are crystallographic *a* and *c* directions). In such devices, effective rotation is accomplished only for electromagnetic wavelengths and acoustic wavelengths which meet the required phase-matching conditions and, accordingly, the device will produce effective rotation of a selected wavelength in accordance with the frequency of shear wave generated by element 63. Final selection is accomplished by means of analyzer element 69 which is placed at such angle relative to that of element 68 as to permit transmission only of the desired ray (in a particular device, element 69 is crossed at 90° to element 68). Alternative arrangements include the use of standing acoustic waves, reflecting members for the right beam, parallel polarizers, and analyzers.

2. The Composition

The fundamental composition of materials herein, while designated by the nominal formula $LiNbO_3$, may and usually does vary somewhat from the indicated stoichiometry. It is well known that such variation may be desirable, for example, to expedite growth in which instance congruent composition, more nearly coinciding with the formula $(Li_2O)_{0.486}(Nb_2O_5)_{0.514}$ is indicated. Variation from stoichiometry may also be introduced for the purpose of adjusting the crystalline birefringence so as to accomplish a desired phase-matching composition at a convenient temperature. For such purposes, it has been found useful to vary the composition over the range indicated by the formula $(Li_2O)_{0.44br0.5}(Nb_2O_5)_{0.56-0.5}$. Where desired operating conditions permit, the congruent composition is preferred since crystals of this composition are generally of the highest optical quality. Within the range indicated, lithium to niobium ratios of lesser value than that of the congruent composition resulted in a decrease in birefringence and, therefore, in a nonlinear device which permits noncritical phase matching of more closely related wavelengths, while increasing the lithium-to-niobium ratio has the opposite effect.

In Vol. 17, *Applied Physics Letters*, p. 104, (1970) addition of magnesium to lithium niobate crystal is described for the purpose of increasing birefringence and thereby permitting phase matching for a given set of wavelengths at higher temperature. While the purpose set forth in that reference was to permit operation at sufficiently high temperature to avoid radiation damage, the same type of compositional modification may be utilized to alter the birefringence and, therefore, the phase-matching conditions at the lower temperatures contemplated in accordance with this invention. To this end, magnesium may be included in amounts up to 1 percent of the total cation content. Other additive materials may also be included in similar maximum amount to this end. Accordingly, the composition of the invention may be described as consisting of at least approximately 99 percent by weight $(Li_2O)_{0.44br0.5}(Nb_2O_5)_{0.56-0.5}$.

The comments set forth in the preceding paragraphs reflect the observation that the entire range of modified or unmodified lithium niobate compositions are equally susceptible to radiation damage of the same magnitude given similar conditions. These comments also reflect the observation that this teaching avoids such damage over the entire range of compositions whether modified or unmodified.

While permitted lithium niobate compositions are described in broad terms, it is the teaching of the invention that iron content is particularly critical, and it is, in fact, a requirement that total iron content be maintained at a level of less than 10 ppm in terms of the number of iron ions (whether 2+ and 3+) relative to the total number of cations present (lithium plus niobium plus any additive such as magnesium).

3. Processing

In this section conditions relevant to preparation of radiation-resistant material are described.

a. Starting Ingredients

The procedures of any of the following subsections (*b* through *d*) are effective in improving radiation resistance, and the procedure of *b* followed by either or both of *c* and *d* may be sufficient to increase radiation resistance to a satisfactory level with any usual starting material. Lithium niobate (and, again, use is made of the nominal formula $LiNbO_3$ with the understanding that this encompasses the range of compositions set forth in the preceding section) is generally grown from a melt which is ordinarily made up of the initial ingredients, $Li_2CO_3$ and $Nb_2O_5$. Such starting ingredients are readily available with total iron levels of the order of 1 ppm or less. Such starting ingredients are ground ordinarily by means of a ball mill or other apparatus utilizing iron-containing abrading surfaces. Following the grinding step there is generally a series of sintering and regrinding steps until complete reaction is attained. After reaction, the product is melted and a crystal is grown, generally by Czochralski technique. It is part of the inventive observation that this series of processing steps as ordinarily practiced results in a significant increase in iron content oftentimes by at least an order of magnitude (to a level of from 10 ppm to 100 ppm in the final crystal).

b. The first inventive procedure is directed toward maintaining a low concentration level of the responsible impurity itself. Accordingly, starting ingredients of usual high purity (of the order of 1 ppm iron) are reacted in such manner as to minimize further iron contamination. Procedures found appropriate may follow the grinding and sintering schedule set forth, however, substituting noniron-containing abrading surfaces (agate has been found suitable) and avoiding contamination during heating procedures. In this latter connection, it has been determined that usual alumina or other ceramic support elements or, for that matter, any iron-containing materials within the heated furnace zone may contribute significant iron to the final composition. Simple replacement of ceramic support members by sapphire or silica support members has, together with the other precautions noted, resulted in a final crystalline product having a total crystalline content of the order of that of the starting ingredients (e.g., 1 ppm).

An alternative procedure avoids grinding and sintering altogether and simply provides for direct reaction of starting ingredients within a non-contaminating container from which crystallization may take place directly. Such reaction must, of necessity, be carried out very gradually because of the evolution of gasses such as carbon dioxide.

The recognition and minimization of contaminating influences during processing constitute a significant aspect of the invention. The literature appears to be devoid of measurements indicating any increase in iron content during processing. The recognition that such increase in fact occurs during normal processing together with the observations and mechanistic explanations set forth herein, suggests crystallization procedures which avoid iron contamination. The first aspect of the invention, therefore, contemplates minimization of iron content in the crystal by (a) utilizing high purity starting materials (iron content no larger than about 1 ppm), and (b) by processing such starting materials to preparation of the ultimate crystalline product in such manner as to substantially avoid any further introduction of iron. With respect to (b), structural members, for use within the heated furnace zone, constructed of ordinary ceramic materials which may contain hundreds or thousands of ppm iron are to be avoided. Alternative materials found suitable include silica, quartz, sapphire, high purity magnesia, or other materials having iron contents generally at the level of 10 ppm or lower. The actual container material which comes in contact with the melt must be of very high purity with respect to iron. Here a tolerable level is no higher than about 1 ppm. To a certain extent, iron content of such container material may be reduced by the gettering action of an initial lithium niobate melt which is then discarded. In this manner, the container surface contacting the melt may be purified to the required level of 1 ppm iron during the growth procedure.

c. It has been noted that a preferred embodiment of the invention concerns an annealing procedure. Such procedure is necessarily carried out over a temperature range substantially below the ferroelectric Curie point, i.e., below a temperature of about 700°C. This upper limit is particularly significant in view of the mechanistic explanation set forth in Section 4 herein. It is postulated that the ineffectiveness of annealing at temperatures substantially above 700°C is due to the increasing equilibrium ratio of $Fe^{2+}$ to $Fe^{3+}$ with increasing temperature. $Fe^{2+}$ introduced into the composition during growth is, therefore, likely not converted to $Fe^{3+}$ during such high temperature annealing. Below temperatures of about 700°C annealing in oxygen-containing atmospheres, such as air, results in conversion of a substantial amount of $Fe^{2+}$ to $Fe^{3+}$ (as measured by optical absorption and also by electron paramagnetic resonance). In fact, sufficient annealing results in water-white crystals indicating substantially complete conversion. Resonance measurements, which are more sensitive, indicate further conversion of $Fe^{2+}$ to $Fe^{3+}$ with annealing, even within crystals which show no observable absorption.

A minimum annealing temperature found adequate for these purposes is about 500°C and minimum time for significant improvement is above 30 minutes. While lower temperatures may be utilized, treatment times are thereby substantially increased. Over the range of from 500° to 700°C preferred minimal treatment times are from about 1 hour at 700°C, 10 hours at 600°C and 100 hours at 500°C. While there are no absolute maximum times, equilibrium appears to be substantially attained at times of the order of 5 hours, 50 hours, and 500 hours at 500°C, 600°C and 700°C, respectively.

As will be seen from the examples, use of this anneal procedure is sufficient in conjunction with low iron containing materials to assure a degree of damage resistance sufficient to permit room temperature operation under many device conditions.

d. The final procedure is field annealing. This procedure is carried out over the same temperature range as the annealing procedure of Procedure (c.,) namely, from 500°C to 700°C. Field annealing is accomplished by use of a current density of at least 1 milliampere per square centimeter of the cross-section orthogonal to current direction. Such current passage is accomplished by imposition of a field of the order of 100 volts per centimeter. Electrode materials are generally noncritical except they should, of course, be non-contaminating with respect to iron. To this end, platinum electrodes have been found satisfactory. Anneal times range from about 5 minutes to 30 minutes. The minimum is required for significant measurable improvement while exceeding the maximum may result in deterioration in crystal quality, for example, by introduction of material from the anode or extraction of host cations by the cathode. This range has been found adequate for a sample length of the order of 2 millimeters. Analysis of electrodes has indicated actual removal of iron during this procedure although a secondary effect may involve attainment of the equilibrium ratio of $Fe^{2+}$ to $Fe^{3+}$ particularly in the absence of the procedure of (c). Since the effect is predominantly due to actual ion drift, required voltages are expressed per unit length. While actual prescribed values are time dependent, an expedient range of from 10 to 1,000 volts per centimeter is indicated. Field annealing produces marked improvement as operated in low-iron material. But results are obtained when it is practiced in conjunction with non-field annealing (Procedure c).

4. Mechanism

The most probable explanation for damage in lithium niobate is dependent on a valence change of iron ions during device operation. In the usual operation, the electromagnetic beam being processed is of nonuniform intensity across the crystal in a direction orthogonal to beam traversal. Ordinarily the center portion of the beam is most intense and the effect is to preferentially excite the $Fe^{2+}$ ions located in the most intensely illuminated regions of the crystal. Such excited ions may then liberate electrons, so being converted to $Fe^{3+}$. Electrons so liberated are captured by other $Fe^{3+}$ ions generally in less intensely illuminated regions of the crystal, and such ions, in turn, are converted to $Fe^{2+}$. The over all effect is a changing distribution of $Fe^{2+}$ ions which results in the creation and redistribution of local refractive index inhomogeneities via the electronic effect.

5. Examples

The following examples reflect use of a particularly sensitive technique for detecting most levels of $Fe^{2+}$. Divalent iron ion levels ordinarily produced in accordance with the inventive processing are below those detectable either by ordinary optical absorption methods or by room temperature parametric measurements. Since such levels are of consequence in device operation, it was necessary to develop a more sensitive procedure. This procedure effectively measures local refractive index changes simply by measuring the light intensity produced by scattering at a prescribed angle off axis of a beam. This procedure is of particular value since it simulates the very condition resulting from laser damage in the operating device. The terminology used for such test method is diffraction efficiency.

The diffraction efficiency value set forth in each instance is a "saturation value", i.e., such measurement is made subsequent to sufficient exposure to result in the maximum damage attainable under the given operating conditions. The test laser beam used for the measurements produced an intensity of about 10 watts per square centimeter at 5,145 A. units. For comparison purposes, all sections utilized in accordance with the examples were of 0.2 centimeter in the thickness direction corresponding with the beam propagation direction. It is possible to convert this value either into refractive index change (responsible for the scattering) or $Fe^{2+}$ content (assuming the postulated mechanism as set forth).

EXAMPLE 1

A crystalline section cut from a congruent composition produced from starting materials having iron content of about 1 ppm and utilizing standard grinding and sintering under conditions such that iron content was increased to about 10 ppm in the final crystal was utilized. Diffraction efficiency was 0.2 percent. Incorporation of such crystal in any of the devices depicted operating at a beam intensity of 10 watts per square centimeter at room temperature results in an unacceptable damage level in a period of 1 minute or less.

EXAMPLE 2

The sample of Example 1 was annealed in air at 600°C for a period of 50 hours. Diffraction efficiency was 0.02 percent. Incorporation of such a crystalline sample in an electrooptic device such as that of FIG. 1 at a laser power level of 10 watts per square centimeter permits operation for a period of at least 1 hour without noticeable damage at such level as to seriously affect device operation.

EXAMPLE 3

The sample of Example 2 was field annealed at 600°C in air for 15 minutes with a current density of 5 milliamperes per square centimeter. Diffraction efficiency was 0.007 percent. Such section incorporated in a device such as that of FIG. 1 at a power level of 30 watts per square centimeter may be continued for a period of at least 1 hour at room temperature without sufficient damage to seriously impair device operation.

EXAMPLE 4

A crystalline sample was prepared from the same starting ingredients of those of Example 1, however, by direct reaction within a platinum crucible and by growth within a growth chamber, all heated elements of which had an iron content of 10 ppm or less. Diffraction efficiency was 0.010 percent. Device operation is similar to that of EXAMPLE 3.

EXAMPLE 5

The sample of Example 4 was annealed in air at 600°C for 50 hours. Diffraction efficiency was less than $10^{-4}$ percent (below the limit of measurement capabilities used). Incorporation of such material into a parametric oscillator, for example, of the configuration shown in FIG. 3, permits room temperature operation at a usable intensity level of 1 watt at the pump (about 100 kwatts/cm$^2$ at the focal point within the $LiNbO_3$ crystal), with a pump wavelength of 5145 A. in nondegenerate operation.

What is claimed is:

1. Device comprising a crystalline body consisting essentially of a single crystal produced in accordance with the process for minimizing radiation damage susceptibility in a crystalline material of the nominal composition $LiNbO_3$ during melt growth within a heated furnace zone, characterized in that all solid matter including structural members, within the said heated zone has a maximum iron content of 10 parts per million based on total cationic or atomic content, and in which the starting ingredients and solid container material which comes in contact with the melt has a maximum iron content of 1 part per million on the same basis, said device being provided with first means for introducing a beam of coherent electromagnetic radiation into said body and second means for extracting a beam of coherent radiation from said body.

2. Device of claim 1 in which at least one of said means comprises an optically polished surface and in which the device is designed such that the extracted beam comprises radiation having a wavelength below about 0.65 micrometer.

3. Device of claim 2 in which the said second means is designed for extracting a beam containing radiation of a wavelength not included within the said first means.

4. Device of claim 3 designed for operation at a temperature below about 100° C.

5. Device of claim 4 designed for operation as a second harmonic generator so that the said radiation has a wavelength half that of the beam associated with the first means.

6. Device of claim 4 designed for operation as a parametric device of such nature that the said radiation has a wavelength greater than that of the beam associated with the said first means.

7. Device of claim 6 provided with means for supporting said radiation, said supporting means consisting essentially of a resonant cavity which includes a focusing means for focusing said electromagnetic radiation within said supporting means.

8. Device of claim 1 in which said process includes the step of annealing said crystalline material in an oxidizing oxygen-containing atmosphere within the temperature range of from 500°C to 700°C.

9. Device of claim 8 in which said annealing comprises maintenance of the said crystalline material within the said temperature range for a period of at least 5 minutes while applying an electric field across the said material, said field being sufficient to produce a current density of at least 1 milliampere per square centimeter of cross section.

* * * * *

UNITED STATES PATENT OFFICE

CERTIFICATE OF CORRECTION

Patent No. 3,700,912 Dated October 24, 1972

Inventor(s) A. M. Glass and G. E. Peterson

It is certified that error appears in the above-identified patent and that said Letters Patent are hereby corrected as shown below:

Column 1, line 9, delete "bZ" and insert --be--;

line 12, after "etc." delete "be".

Column 8, line 9, change "$(Li_2O)_{0.44bro0.5}$" to read --$(Li_2O)_{0.44-0.5}$--;

line 37, change "$(Li_2O)_{0.44bro0.5}$" to read --$(Li_2O)_{0.44-0.5}$--;

line 52, change "2+ and 3+" to read --2+ or 3+--.

Column 11, line 8, delete "()" around c.

Column 12, line 47, change "$10-_4$" to read --$10^{-4}$ --.

Signed and sealed this 13th day of March 1973.

(SEAL)
Attest:

EDWARD M.FLETCHER,JR.
Attesting Officer

ROBERT GOTTSCHALK
Commissioner of Patents